United States Patent
Guim Bernat et al.

(10) Patent No.: US 12,282,366 B2
(45) Date of Patent: Apr. 22, 2025

(54) SYSTEM, APPARATUS AND METHODS FOR POWER COMMUNICATIONS ACCORDING TO A CXL POWER PROTOCOL

(71) Applicant: Intel Corporation, Santa Clara, CA (US)

(72) Inventors: Francesc Guim Bernat, Barcelona (ES); Karthik Kumar, Chandler, AZ (US); Alexander Bachmutsky, Sunnyvale, CA (US); Dimitrios Ziakas, Portland, OR (US); Rita D. Gupta, Cedar Park, TX (US)

(73) Assignee: Intel Corporation, Santa Clara, CA (US)

( * ) Notice: Subject to any disclaimer, the term of this patent is extended or adjusted under 35 U.S.C. 154(b) by 684 days.

(21) Appl. No.: 17/443,374

(22) Filed: Jul. 26, 2021

(65) Prior Publication Data
US 2021/0349512 A1    Nov. 11, 2021

(51) Int. Cl.
*G06F 1/26* (2006.01)
*G06F 1/3203* (2019.01)
(Continued)

(52) U.S. Cl.
CPC .............. *G06F 1/26* (2013.01); *G06F 1/3234* (2013.01); *H04L 12/10* (2013.01); *G06F 1/3203* (2013.01); *Y02D 10/00* (2018.01)

(58) Field of Classification Search
CPC ........ G06F 1/26; G06F 1/3203; G06F 1/3234; H04L 12/10; Y02D 10/00
See application file for complete search history.

(56) References Cited

U.S. PATENT DOCUMENTS

| | | | |
|---|---|---|---|
| 8,843,772 B2* | 9/2014 | Hormuth | G06F 11/3006 713/340 |
| 9,477,279 B1* | 10/2016 | Piszczek | G06F 1/206 |

(Continued)

FOREIGN PATENT DOCUMENTS

| | | |
|---|---|---|
| CN | 113129205 A | 7/2021 |
| WO | 2016014044 A1 | 1/2016 |

OTHER PUBLICATIONS

European Patent Office, Response to the Communication under Rules 69 and 70a(1) EPC dated Jul. 28, 2023 in European Patent Application No. 22165696.0 (60 pages).

(Continued)

*Primary Examiner* — Terrell S Johnson
(74) *Attorney, Agent, or Firm* — Essential Patents Group, LLP; Christopher K. Gagne

(57) ABSTRACT

In one embodiment, an apparatus includes an interface to couple a plurality of devices of a system, the interface to enable communication according to a Compute Express Link (CXL) protocol, and a power management circuit coupled to the interface. The power management circuit may: receive, from a first device of the plurality of devices, a request according to the CXL protocol for updated power credits; identify at least one other device of the plurality of devices to provide at least some of the updated power credits; and communicate with the first device and the at least one other device to enable the first device to increase power consumption according to the at least some of the updated power credits. Other embodiments are described and claimed.

20 Claims, 8 Drawing Sheets

(51) Int. Cl.
*G06F 1/3234* (2019.01)
*H04L 12/10* (2006.01)

(56) References Cited

U.S. PATENT DOCUMENTS

| | | | |
|---|---|---|---|
| 11,416,056 B2* | 8/2022 | Knoth | G06Q 50/06 |
| 2013/0318371 A1 | 11/2013 | Hormuth | |
| 2020/0133367 A1* | 4/2020 | Wang | H03M 13/6588 |
| 2020/0192798 A1* | 6/2020 | Natu | G06F 12/12 |
| 2020/0285420 A1 | 9/2020 | Guim Bernat et al. | |
| 2020/0409441 A1 | 12/2020 | Hatch et al. | |
| 2021/0011864 A1 | 1/2021 | Guim Bernat et al. | |
| 2021/0200545 A1 | 7/2021 | Marolia et al. | |
| 2021/0349512 A1* | 11/2021 | Guim Bernat | H04L 12/10 |
| 2021/0349840 A1 | 11/2021 | Kumar et al. | |
| 2021/0374056 A1 | 12/2021 | Malladi et al. | |
| 2022/0358042 A1 | 11/2022 | Malladi et al. | |

OTHER PUBLICATIONS

European Patent Office, Office Action dated Sep. 22, 2022 in European Patent Application No. 22165696.0 (11 pages).
European Patent Office, Office Action dated Aug. 5, 2022 in European Patent Application No. 22159326.2 (10 pages).
U.S. Appl. No. 17/032,056, filed Sep. 25, 2020, entitled "System, Apparatus and Method for Dynamically Providing Coherent Memory Domains," by Francesc Guim Bernat et al.
Intel Corporation, "Compute Express Link, Specification, Mar. 2019, Revision 1.0," Mar. 2019, 206 pages.
Intel Corporation, Compute Express Link™ 2.0 White Paper, Dec. 2020, 4 pages.
United States Patent Office, Notice of Allowance dated Sep. 11, 2024 in U.S. Appl. No. 17/443,379 (20 pages).
Office Action from European Patent Application No. 22159326.2 notified Dec. 3, 2024, 10 pgs.

* cited by examiner

| Power Allocation ID (212) | Borrower ID (214) | List of Sharers (216) | Amount of Power Borrowed (218) | Duration (219) |
|---|---|---|---|---|
| ID | ID | List | List of Credits | Time |
| 0x3433 | 0X23 | 0X1,...,0XN | 1W,...,2W | 300µS |
| ⋮ | ⋮ | ⋮ | ⋮ | |
| ⋮ | ⋮ | ⋮ | ⋮ | |

SYSTEM, APPARATUS AND METHODS FOR POWER COMMUNICATIONS ACCORDING TO A CXL POWER PROTOCOL

BACKGROUND

With ever-increasing complexity of computing systems, especially in data center and cloud architectures, a recent interconnect protocol, Compute Express Link (CXL), opens up a new set of capabilities. This is so, since with these links, computing systems can be provided with the ability to dynamically add components such as memory or accelerators, and potentially have them in the same coherent domain. CXL currently provides certain protocols from an interconnect perspective to facilitate connectivity to these add-on devices. With these mechanisms, complex computing systems can be composed on-the-fly.

However, one issue that may exist due to flexible compute arrangements is power consumption. For example, with given power budgets including thermal design power (TDP) of a processor combined with other components' power budgets, the power consumed by CXL-attached memory and accelerators can potentially equal or exceed available power resources. Given that CXL resources are often seen as local resources, this massive potential increase in power budgets may negatively affect performance.

BRIEF DESCRIPTION OF THE DRAWINGS

FIG. 2 is a block diagram of a storage in accordance with an embodiment.

DETAILED DESCRIPTION

Figure 1:
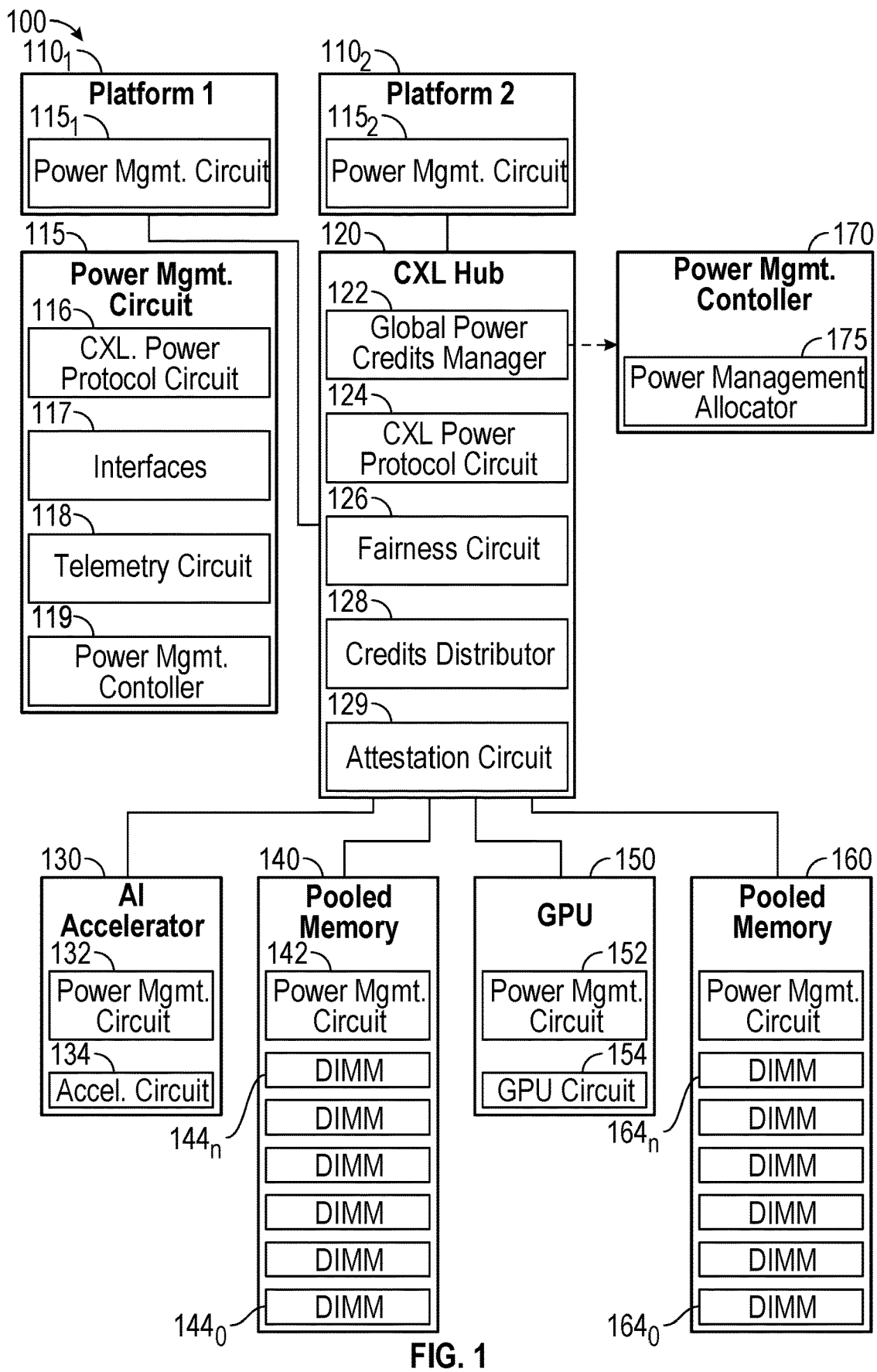
FIG. 1 is a block diagram of a system in accordance with an embodiment.

In various embodiments, a computing system that provides for interconnection of at least some devices and other components by way of Compute Express Link (CXL) interconnects in accordance with a given CXL specification such as the CXL Specification version 2.0 (published 2020), any future update, version (e.g., version 3.0) or variation thereof, may flexibly and dynamically allocate power. More particularly, power can be dynamically allocated and shared amongst the various systems components according to power messaging sent across the CXL links. In a particular embodiment, power messaging may be according to a CXL-.power protocol as described herein.

This CXL.power protocol may augment a basic CXL protocol architecture, which currently provides for multiple specific communication protocols (including CXL.memory, CXL.cache memory and CXL.io) in order to allow fine-grained power sharing and coordination among multiple connected CXL devices. With this arrangement, power can be allocated as a system resource to be managed consistently across all different devices. While particular embodiments described herein are in connection with a CXL-connected system and according to a CXL.power protocol, understand that embodiments are not limited in this regard and are applicable to other power sharing techniques.

Multiple CXL-connected devices may perform handshaking communications using this CXL.power protocol to borrow or withdraw given power credits (which are translated into actual power) for certain amounts of time. The same protocol, once there is an agreement, can be used to communicate with an external entity managing power (e.g., a drawer or rack power management) to provide the agreed power transfers. Note that this power management entity may be optional, but in some cases can be present to enable identification of potential attacks or misbehaviors with regard to power sharing. In some cases, the centralized device may be a CXL switch or hub, alone or in combination with a more global component such as a rack or drawer power management component. Such components also may be used when a CXL-connected device has its own power source (e.g., a CXL-connected disaggregated storage device with its own power source) or to augment CXL-delivered power with available power (e.g., an accelerator having an extra power connector).

A device incorporating an embodiment may interface with compute or media elements of the device in order to identify when more power is required for a specific burst or when power can be shared. In turn, a power management circuit of the device can communicate this information using the CXL.power protocol.

In this way, an application or software stack can perform device-to-device power crediting at a fine-grained level, e.g., to implement advanced quality of services policies. As one example, assume an Application X is running a bit-stream on an accelerator (e.g., a field programmable gate array (FPGA)) and the application is in execution on a central processing unit (CPU). Assume Application X is at a phase where the bit-stream requires more power. With an embodiment, power credits can be transferred from the CPU (e.g., cores that are mapped into the application) to the accelerator where the bit-stream is executed.

Thus devices can, in a centralized or decentralized manner, more readily share power as a common resource. In this way, when a given device has greater power requirements, the device can request and receive additional power, e.g., in the form of power credits, that translates into additional power budget for consumption. Similarly, when a device has lesser power needs for a particular phase of operation, the device may allow other devices to borrow power, e.g., in the form of power credits.

Referring now to FIG. 1, shown is a block diagram of a system in accordance with an embodiment. As shown in FIG. 1, a computing system 100 may be any type of system that provides interconnection of at least some components by links via which CXL-based communications may occur. In the embodiment of FIG. 1, a multi-platform system is illustrated having multiple platforms $110_{1,2}$. While only two platforms are illustrated, understand that greater numbers of such platforms may be present in particular use cases. As an example, platforms 110 themselves may be formed of a given computing system at minimum having at least one CPU, memory, storage and interface circuitry.

As further illustrated in the high level of FIG. 1, platforms 110 also may include corresponding power management circuits $115_{1,2}$. In general, power management circuit 115 may be implemented as a hardware circuit, e.g., as a microcontroller or other programmable processing circuit to perform power management functions on behalf of the platform. As an example, power management circuit 115 may be implemented as a separate processing engine (e.g., microcontroller or available core).

As shown in the inset of FIG. 1, power management circuit 115 may include protocol circuitry 116 (namely CXL.power protocol circuitry) to enable communication of CXL.power messages as described herein. Power management circuit 115 further includes interfaces 117 to provide interfaces to various components of the platform to be power managed. A telemetry circuit 118 may perform power monitoring of the circuitry of the platform. A power management controller 119 may perform power management operations such as determining appropriate power levels for the various components of the computing platform, e.g., based on current or expected activity, power budgets, thermal budgets and other environmental information.

Still with reference to FIG. 1, platforms 110 couple to a CXL switch or hub 120. As used herein, the terms "hub" and "switch" are used interchangeably to refer to interface circuitry that enables routing of communications between devices, and particularly herein, routing of CXL-based communications. For ease of discussion going forward, such devices will be primarily referred to herein as "hubs."

As illustrated, hub 120 includes various components to implement a CXL.power protocol and power management as described herein, including a global power credits manager 122. Manager 122 may be configured to perform power management including initial allocation of power credits to the various devices of the system, and updating power credits to enable power sharing as described herein. In an embodiment, global power credit manager 122 may be responsible to execute and finalize "contracts" that are established between the different devices. Once a contract is closed, it: generates a new mapping of power distribution across the devices; validates that the new power distribution does not break any existing contract; creates a new contract (that is hosted into a credits distribution circuit 128); potentially connect to a platform power manager to request a new power distribution based on the new established credit, which includes a time out for the established contract. Once the contract time out happens, it contacts the power manager to return the power credits from the borrower to the original owners of the credits.

A CXL.power protocol circuit 124 may operate as described above to enable communication of CXL.power protocol messages. A fairness circuit 126 ensures that power sharing is performed in a fair manner across devices, such that all devices meet their service level agreements (SLAs), while providing additional requested power to various devices when available. Of course, devices may have different priorities established by management of the platform which may be factored in here.

Still with reference to hub 120, a credits distribution circuit 128 may be configured to determine an appropriate allocation of credits on a dynamic basis. Such re-allocation of power credits may occur, for example, when devices are added into or removed from a system, in addition to handling incoming requests for power sharing. As further illustrated, hub 120 further includes an attestation circuit 129, which may be responsible to validate that devices are trustworthy. Attestation circuit 129 at boot time connects into an attestation entity to validate each device. It may provide information to the entity such as: device ID; manufacturer; and other hashes on firmware, etc. Based on such attestation, circuit 129 may determine whether a device is trustworthy with respect to CXL.power operation. Only attested devices are allowed to participate to CXL.power features, in an embodiment. Furthermore, alone or in combination with other power management circuitry such as fairness circuit 126, a power enforcement circle may be configured to ensure that devices behave in the agreed way and do not use more power than negotiated.

While FIG. 1 shows an embodiment in which power management circuitry to perform CXL-based power sharing is present in hub 120, understand that embodiments are not limited in this regard. For example in another implementation, a configuration with a CPU connected to multiple CXL devices without any hub or switch in the middle, may integrated the power management circuitry shown in FIG. 1 to effect CXL-based power sharing.

Still with reference to FIG. 1, hub 120 couples to various devices. In the embodiment shown, these devices may include an accelerator 130, pooled memory 140, 160 and a graphics processing unit (GPU) 150. As shown, each of these devices includes various circuitry to perform its function. Accelerator 130, which may be an artificial intelligence (AI) accelerator, may include acceleration circuitry 134; pooled memories 140, 160 may include corresponding dual inline memory modules (DIMMs) $144_{0-N}$ and $164_{0-N}$. In turn, GPU 150 includes a GPU circuit 154.

As further illustrated, each of these devices further includes power management circuitry (132, 142, 152 and 162). In an example, each of these power management circuits may generally be configured the same as power management circuit 115 shown in the inset of FIG. 1, so that each device may participate in CXL.power protocol communications, including receiving initial allocations of power and requesting and responding to requests for additional power according to the power sharing techniques described herein.

Still with reference to FIG. 1, hub 130 further couples to a power management controller 170, which may be a rack or drawer-based power manager which may operate, e.g., in connection with a baseboard management controller (BMC). As shown, controller 170 includes a power management allocator 175, which may identify and provide an overall power budget to hub 120. In turn, hub 120 can allocate initial power levels to the individual devices. Furthermore, hub 120 may request additional power during operation to accommodate the power requests from the various devices. Depending upon operating and environmental conditions, power management controller 170 may grant or deny such additional power requests. Understand while shown at this high level in the embodiment of FIG. 1, many variations and alternatives are possible.

FIG. 1 may further be used to illustrate operation of a power sharing scenario using a CXL.power protocol in accordance with an embodiment. Assume that platform $110_1$ requests additional power credits, e.g., 10 power credits (which may correspond to 10 watts (W)) for a given time duration (e.g., 500 microseconds (µs)). Platform $110_1$ may issue this request to hub 120. In turn hub 120 sends a multicast request to the other devices of system 100 to borrow credits for this time duration. In turn, each of the various devices may send a response back, e.g., in the form of a unicast message to indicate a number of power credits that it is able to offer.

Based on this request and the offers provided, hub 120 may determine an allocation of these credits to grant to platform $110_1$ and from which devices. To this end, hub 120, using fairness circuit 126, may monitor and consider fairness across the devices. In the example shown, hub 120 may determine that from the offers provided, accelerator 130 may grant four credits, GPU 150 may grant four credits and memories 140, 160 each may grant one credit. Accordingly, hub 120 sends a unicast message back to these devices to indicate the credits thus shared so that these devices operate within the new power credit constraints for the indicated duration. Hub 120 also sends another message to platform 110 to indicate the new credit level to be allocated for the duration. While this particular illustration details certain allocations, understand that different allocations can occur in other examples.

For example, not all requested credits may be allocated. As another example, if a requester asks for 10 credits, the response could be zero (nothing), 3 (partial) or 10 (all). It is also possible that the response is for the full requested amount (10 credits in the above example), but for less time than requested (e.g., 100 µs instead of requested 500 µs). It is a negotiation protocol, so power redistribution happens when all parties agree with new allocation, in some embodiments.

Note in addition that the power sharing messages may also be initiated by a device to indicate that it has power to share. Stated another way, the power credits can be bidirectional. In typical compute systems, a server complex provides power to its devices. However, in an embodiment in which a device has its own power source, it can contribute power to the system, e.g., in the form of power credits. Such operation can be similar to solar panels providing power to the grid when there is excess power generated. As an one particular example here, assume a CXL-connected device such as accelerator 130 (or an attached storage device) is separately powered, such device can actually give power to one of more CPUs of platforms 110, according to the CXL-based power sharing techniques described herein.

Referring now to FIG. 2, shown is a block diagram of a storage to store power sharing information in accordance with an embodiment. As shown in FIG. 2, a storage 200, which may be implemented as a cache memory or other memory included in a CXL hub (e.g.,) may store a power sharing table. In the embodiment shown, this table has a plurality of entries $210_{0-N}$, each having multiple fields to store information associated with a particular power sharing request. As illustrated, each entry 210 includes an identifier field 212 to store an identifier of a power sharing request, which may be in the form of a device ID of the requesting entity and a local counter. Each entry 210 further includes a borrower field 214 to store an ID of the borrowing entity. A sharing field 216 may list one or more entities providing power credits to the borrower. In turn, amount field 218 provides a list of credits, on a per entity basis, to identify the amount of power credits borrowed from each lender. Finally, a duration field 219 may store a time duration of the power sharing. Of course while shown with this particular example in FIG. 2, a power sharing table may take different forms and other embodiments.

For example, a single power sharing request can be split into multiple entries in the table. For example, when some entries agree to provide credits for 300 µs, but other entries agree to only 200 µs, there may be two entries with different sets of sharers. Also, negotiation of power sharing may occur ahead of time (predictive sharing), so the table may have an additional field for a start time, or there can be a power timer wheel, with entities in the wheel pointing to different tables, each one implemented as in FIG. 2.

As described above, a CXL.power protocol may provide for handshaking across multiple CXL-connected devices to enable fine-grained power sharing. In an embodiment, there may be three fundamental types of messages: (1) a unicast or multicast message requesting power credits; (2) a broadcast/multicast/unicast notification message to all/some/specific connected device(s) that previously granted power credits have been withdrawn; and (3) a unicast response message on the multicast. Each are discussed.

For purposes of discussion assume a multicast message is sent to some or all devices connected to the system asking for how many power credits can be shared. The multicast message may include: an ID of the multicast request (which may be generated based on device ID and a local counter); an ID of the device requesting the power borrowing; a duration in time that the power borrowing is going to occur (which may be coded as: a value such as an integer number representing the amount of units of time for the power borrowing; and a metric that is the unit for the value (e.g., µs, ms etc.). Note in a unicast request example, the requester may send the unicast message to, e.g., a trusted device or a device or belonging to the same group, or some other identified device.

In turn, a broadcast/multicast/unicast notification message may be sent to all/some/specific connected device(s) to inform that previously granted power credits have been withdrawn. This message can be used to provide much needed power for some emergency tasks, such as data backup before failure/disconnect, urgent interrupt processing, etc. The notification message may include the time duration provided before such power is withdrawn. Similarly a notification message may be sent to indicate that previously taken credits have been returned.

A unicast response message to a multicast request may be provided by each device and may include: multicast ID; amount of credits that can be shared; and duration from where the credits can be shared.

In some cases, the CXL.power protocol, once there is an agreement, may be used to communicate with an external entity managing power (e.g., drawer or rack power management) in order to provide the agreed power transfers. This portion of the protocol basically includes several messages, including a unicast request for a given new power distribution based upon an agreement provided on a multicast ID. This message may include: list of devices and the new power distribution, based on what power credits have been moved from one place to the other; and duration of time valid for this power distribution. Note that after the time has expired, the power manager may revert to the previous or default configuration. Another message for this portion of the protocol may include a unicast response to a previous unicast request. This message may include an acknowledge of the new distribution; and if there is not acknowledgement, a new distribution may possibly be proposed (which can be a subset of the proposal). In addition, a hub may, in response to detection of some misbehaviors (e.g., an entity multicasting too much, etc.) determine to drop messages from that entity.

Figure 3:
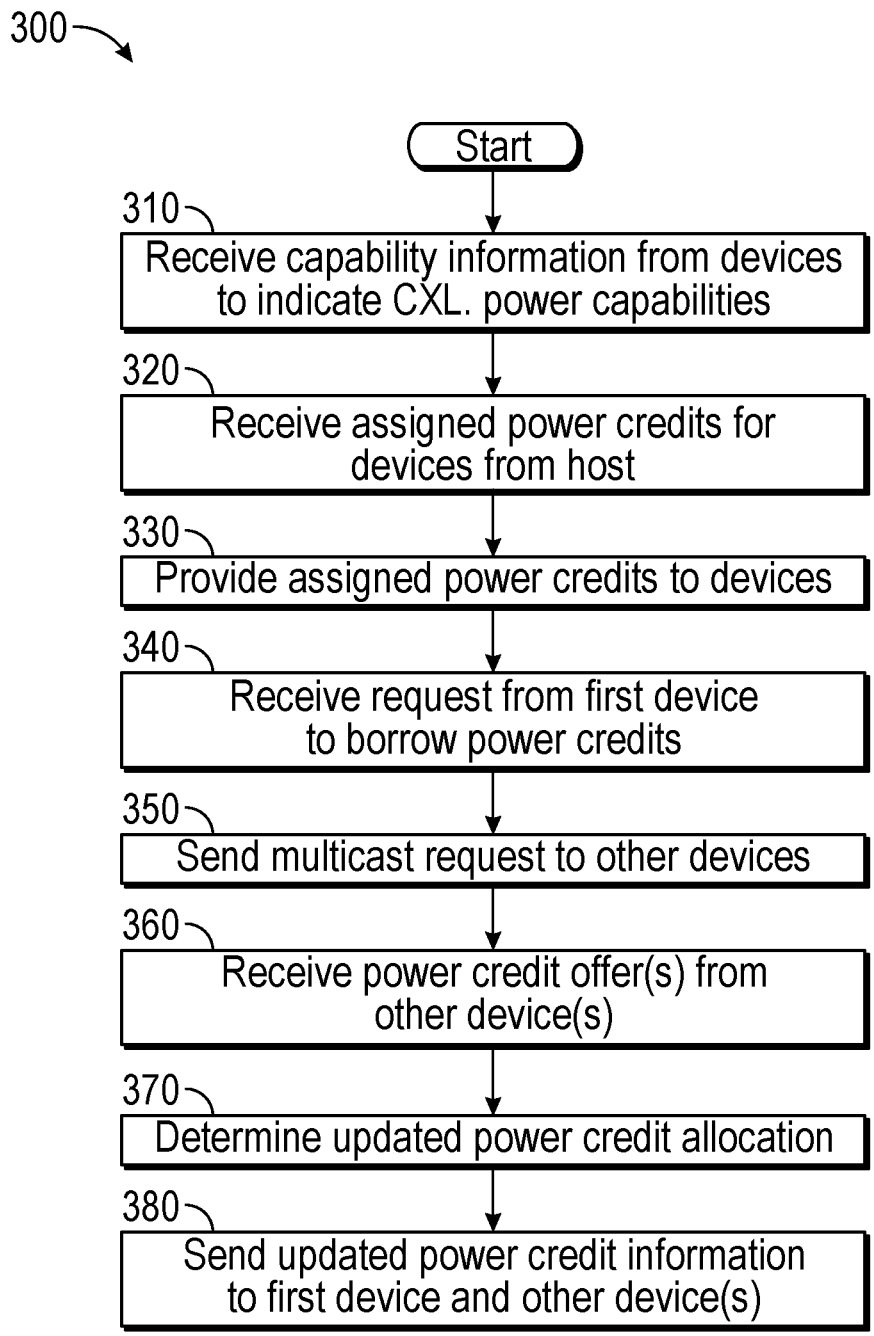
FIG. 3 is a flow diagram of a method in accordance with an embodiment.

Referring now to FIG. 3, shown is a flow diagram of a method in accordance with an embodiment. As shown in FIG. 3, method 300 is a method for performing power management in a system using a CXL.power protocol in accordance with an embodiment. As such, method 300 may be performed by a centralized device such as a CXL hub. Accordingly, method 300 may be performed by hardware circuitry included in this hub, in combination with firmware and/or software.

As illustrated, method 300 begins by receiving capability information from devices to indicate their CXL.power capabilities (block 310). In an embodiment, CXL.power communications may be sent as CXL mailbox commands over an out-of-band interface to negotiate and update power credits. Such capability information may be stored in the devices themselves, e.g., in an extended Peripheral Component Interconnect Express (PCIe) capability structure. The capability information, in an embodiment, may include information regarding power credits such as minimum credits required for idle power (PCredit_Idle), credits required for functionality optimized power (e.g., active TDP) (PCredit_Opt), and a maximum power credit for usage that may be needed for maximum throughput (PCredit_Max). Such capability information may further include generated power credits and power credits that can be shared with others.

Then at block 320 the hub may receive assigned power credits for the devices from a host. In an embodiment, during enumeration a host operating system (OS) may program the assigned power credits to each of the components, e.g., based on system design and respective power requirements. Next at block 330 the assigned power credits may be provided to the devices, e.g., using CXL.power protocol messages. As this point, a system may be configured for normal operation and thus devices may begin executing according to their allocated power levels.

Still with reference to FIG. 3, assume that during operation a first device, which may be a platform itself or a component of a platform, seeks to borrow credits and thus sends a request to the hub (block 340). In an embodiment, the first device may send an OOB message via a mailbox command, namely a "Request PCredit" message, with new value requested. In some cases, the command may be directed to the hub and in other cases, the hub may forward the message to a BMC/platform manager. Note that a hub may have a queue for such requests, so for efficiency purposes, the hub may process a number of requests at once instead of one-by-one.

In response to this request, the hub may send a multicast request to the other devices (block 350). In response to this request, the hub may receive power credit offers from one or more of the devices (block 360). Based on these offers as well as additional information, including the amount of requested power, environmental conditions, fairness and so forth, the hub may determine an updated power credit allocation to provide to the first device, as well as determining which devices may have credits borrowed (block 370).

Based on this determination control passes to block 380 where updated power credit information can be sent to the first device and other devices. In an embodiment, this updated information may be sent via messages to indicate a level of updated power credits to each device and a time duration for which these updated power credits are to apply. If additional credit is available, an "Update_Pcredit" message is sent to one or more corresponding components to re-assign credits with an Update PCredit value. Thus a device may receive (from the hub, e.g., as initiated by the hub and/or a BMC/platform manager) an updated value of PCredit via an OOB command "Update PCredit". The component, upon updating the value, sends a completion with "success/fail" information. Note that this updated power credit level is to be at a credit level equal or greater than PCredit_Idle. In case of failure of a device to witch to a low power mode, the device responds to "Update_Pcredit" with a "Fail" message.

Figure 4:
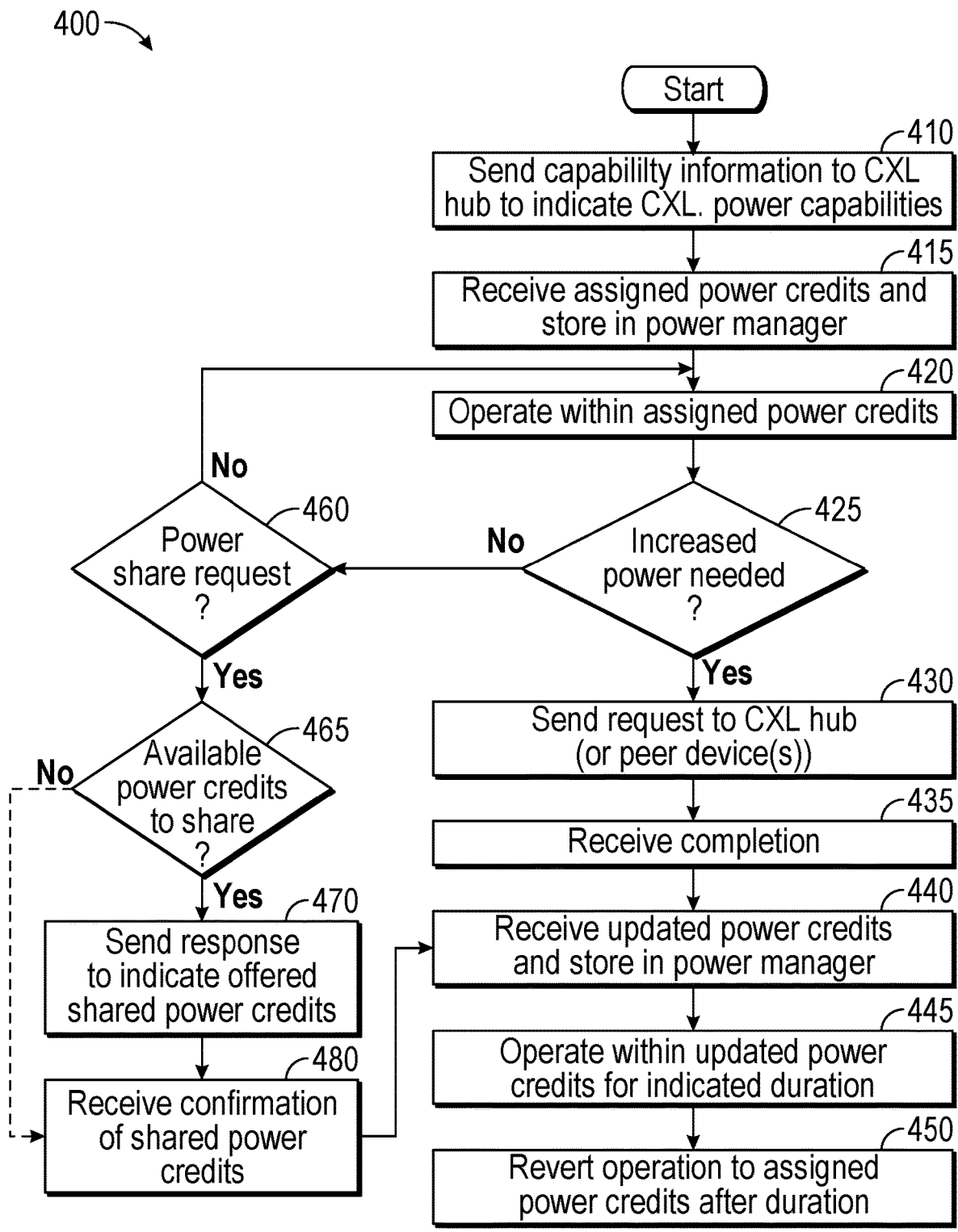
FIG. 4 is a flow diagram of a method in accordance with an embodiment.

At this point, the devices may operate according to the updated power credits for the indicated time duration. Understand that while shown at this high level in the embodiment of FIG. 3, many variations and alternatives are possible. For example, while method 300 illustrates an exemplary embodiment in which centralized power sharing occurs, peer-to-peer power sharing is also possible. Here, a unicast request can be sent to a particular device to borrow power for a particular unit of time. The request may include: multicast ID; power requested; and duration requested. Note that this message can be a follow up of the earlier multicast. A unicast response message may be sent to a previous unicast acknowledging that the power credits are granted for the period of time Referring now to FIG. 4, shown is a flow diagram of a method in accordance with another embodiment. As shown in FIG. 4, method 400 is a method for performing power management in a device using a CXL.power protocol in accordance with an embodiment. As such, method 400 may be performed by a given device having hardware circuitry, in combination with firmware and/or software.

At block 410, a device sends its capability information (e.g., stored in a PCIe capability structure) to a CXL hub to indicate its CXL.power capabilities. Then at block 415 the device receives assigned power credits, which may be stored in a power management circuit of the device. Accordingly, at this point the device may operate within its assigned power credits (block 420).

As further illustrated, assume that at some point during operation the device determines a need for increased power consumption, e.g., due to an increased workload (diamond 425). If so, at block 430 it may send a request to the CXL hub (or one or more peer devices) for increased power credits. Thus while in the example of FIG. 4, communications are shown involving a CXL hub, it is equally possible for a decentralized or peer-to-peer power sharing operation to occur. For example, in CXL3.0 systems and onwards, devices may be configured to request power credits directly from peer components, e.g., via peer-to-peer messaging where each device can share power credits from their initial assigned value. Understand that such power sharing arrangements may be transparent to a hub.

Still with reference to FIG. 4, at block 435 the device may receive a completion to indicate acknowledgement of the request. Thereafter at block 440, the device may receive updated power credits, e.g., the number of credits it requested or a smaller number. In any event, the device may store this updated power credit limit (which may come with an indication of a time duration for which these increased power credits are granted) in a power management circuit. Accordingly, at block 445 the device may operate within the updated power credits for the indicated duration. After this time, at block 450 the device may revert back to its assigned power credit level. Note that such operation may occur without the need for additional communications.

Still with reference to FIG. 4, it may further be determined (at diamond 460) whether the device receives a power share request (which may be received from the hub or directly from a device). If so, the device may determine at diamond 465 whether it has available power credits to share. If so, the device may send a response to indicate the offered power credits to be shared (block 470). At block 480 the device may receive a confirmation of the shared power credits, which may indicate whether all or only a portion of the offered credits are taken, as well as a time duration for this power sharing. At this point, control passes to block 440, discussed above.

Understand while in some cases, e.g., according to policy, priority or other basis, if a device determines that it does not have available power credits to share (at diamond 465), no further power sharing occurs with respect to that device for that request. However in some circumstances a hub may determine on its own to withdraw certain power credits from the device. Accordingly, control may optionally pass from diamond 465 to block 480 where a device may receive a CXL.power message from a hub for an updated power allocation at a lower level, e.g., for a given duration of time. Understand that while shown at this high level in the embodiment of FIG. 4, many variations and alternatives are possible.

Thus with embodiments, power management can be collaboratively allocated and managed between all CXL-attached devices. Using a CXL.power protocol as described herein, communications can occur as to power requirements, asking for more power or giving up some power based on current and anticipated demand. In this way, an overall fixed power budget can be dynamically shared, even among devices from different manufacturers. CXL.power protocol communications may be used to exchange power requirements in terms of asking for more power to handle spikes or giving up power during periods of low activity or inactivity, in a fine-grained manner that allows power to be a shared resource. As one example, intelligent application-phase based overall power management may occur across a CPU and set of CXL-attached devices.

Figure 5:
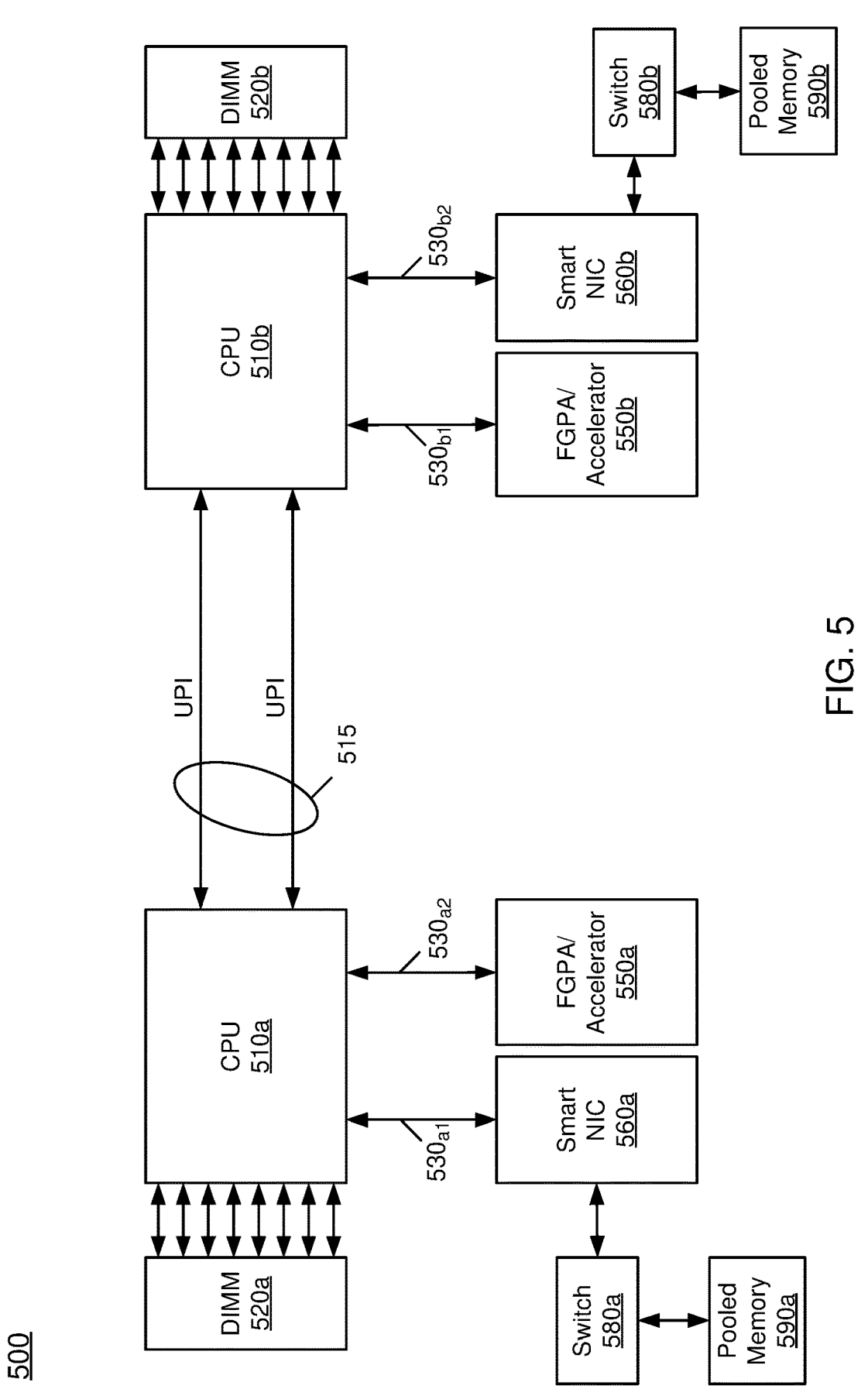
FIG. 5 is a block diagram of a system in accordance with another embodiment of the present invention.

Referring now to FIG. 5, shown is a block diagram of a system in accordance with another embodiment of the present invention. As shown in FIG. 5, a system 500 may be any type of computing device, and in one embodiment may be a server system. In the embodiment of FIG. 5, system 500 includes multiple CPUs 510a,b that in turn couple to respective system memories 520a,b which in embodiments may be implemented as DIMMs such as double data rate (DDR) memory, persistent or other types of memory. Note that CPUs 510 may couple together via an interconnect system 515 such as an Intel® Ultra Path Interconnect or other processor interconnect technology.

To enable coherent accelerator devices and/or smart adapter devices to couple to CPUs 510 by way of potentially multiple communication protocols, a plurality of interconnects 530a1-b2 may be present. In an embodiment, each interconnect 530 may be a given instance of a CXL.

In the embodiment shown, respective CPUs 510 couple to corresponding field programmable gate arrays (FPGAs)/accelerator devices 550a,b (which may include GPUs, in one embodiment. In addition CPUs 510 also couple to smart NIC devices 560a,b. In turn, smart NIC devices 560a,b couple to switches 580a,b (e.g., CXL switches in accordance with an embodiment) that in turn couple to a pooled memory 590a,b such as a persistent memory. In embodiments, switches 580 may implement circuitry described herein to perform CXL-based power sharing as described herein. Of course, embodiments are not limited to switches and the techniques described herein may be performed by other entities of a system, including CPUs 510.

Figure 6:
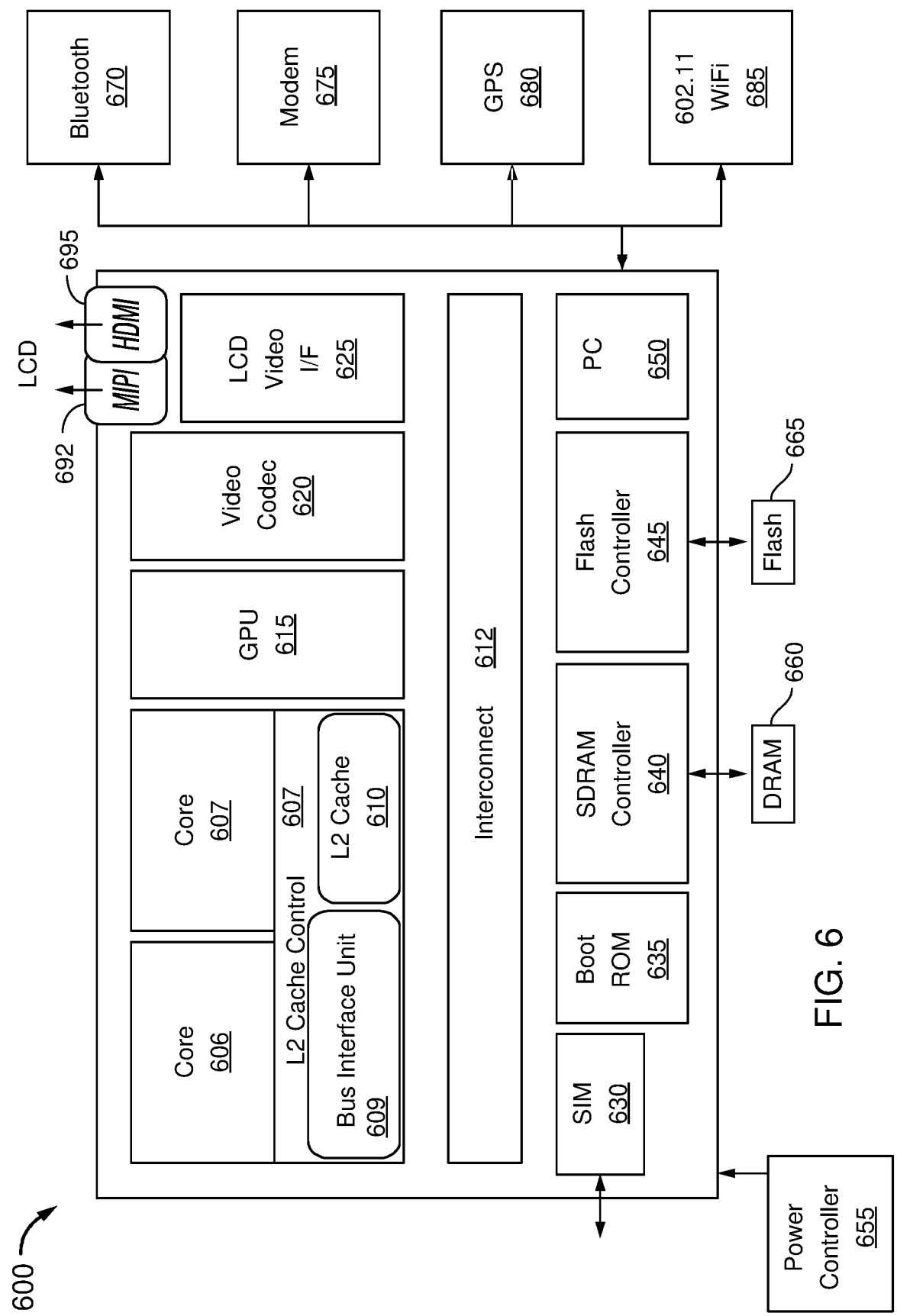
FIG. 6 is a block diagram of an embodiment of a SoC design in accordance with an embodiment.

Turning next to FIG. 6, an embodiment of a SoC design in accordance with an embodiment is depicted. As a specific illustrative example, SoC 600 may be configured for insertion in any type of computing device, ranging from portable device to server system. Here, SoC 600 includes 2 cores 606 and 607. Cores 606 and 607 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 606 and 607 are coupled to cache controller 608 that is associated with bus interface unit 609 and L2 cache 610 to communicate with other parts of system 600 via an interconnect 612.

Interconnect 612 provides communication channels to the other components, such as a Subscriber Identity Module (SIM) 630 to interface with a SIM card, a boot ROM 635 to hold boot code for execution by cores 606 and 607 to initialize and boot SoC 600, a SDRAM controller 640 to interface with external memory (e.g., DRAM 660), a flash controller 645 to interface with non-volatile memory (e.g., flash 665), a peripheral controller 650 (e.g., an eSPI interface) to interface with peripherals, video codec 620 and video interface 625 to display and receive input (e.g., touch enabled input), GPU 615 to perform graphics related computations, etc. In addition, the system illustrates peripherals for communication, such as a Bluetooth module 670, 3G modem 675, GPS 680, and WiFi 685. Also included in the system is a power controller 655, which may implement circuitry described herein to perform CXL-based power sharing in accordance with an embodiment. Further illustrated in FIG. 6, system 600 may additionally include interfaces including a MIPI interface 692, e.g., to a display and/or an HDMI interface 695 also which may couple to the same or a different display.

Figure 7:
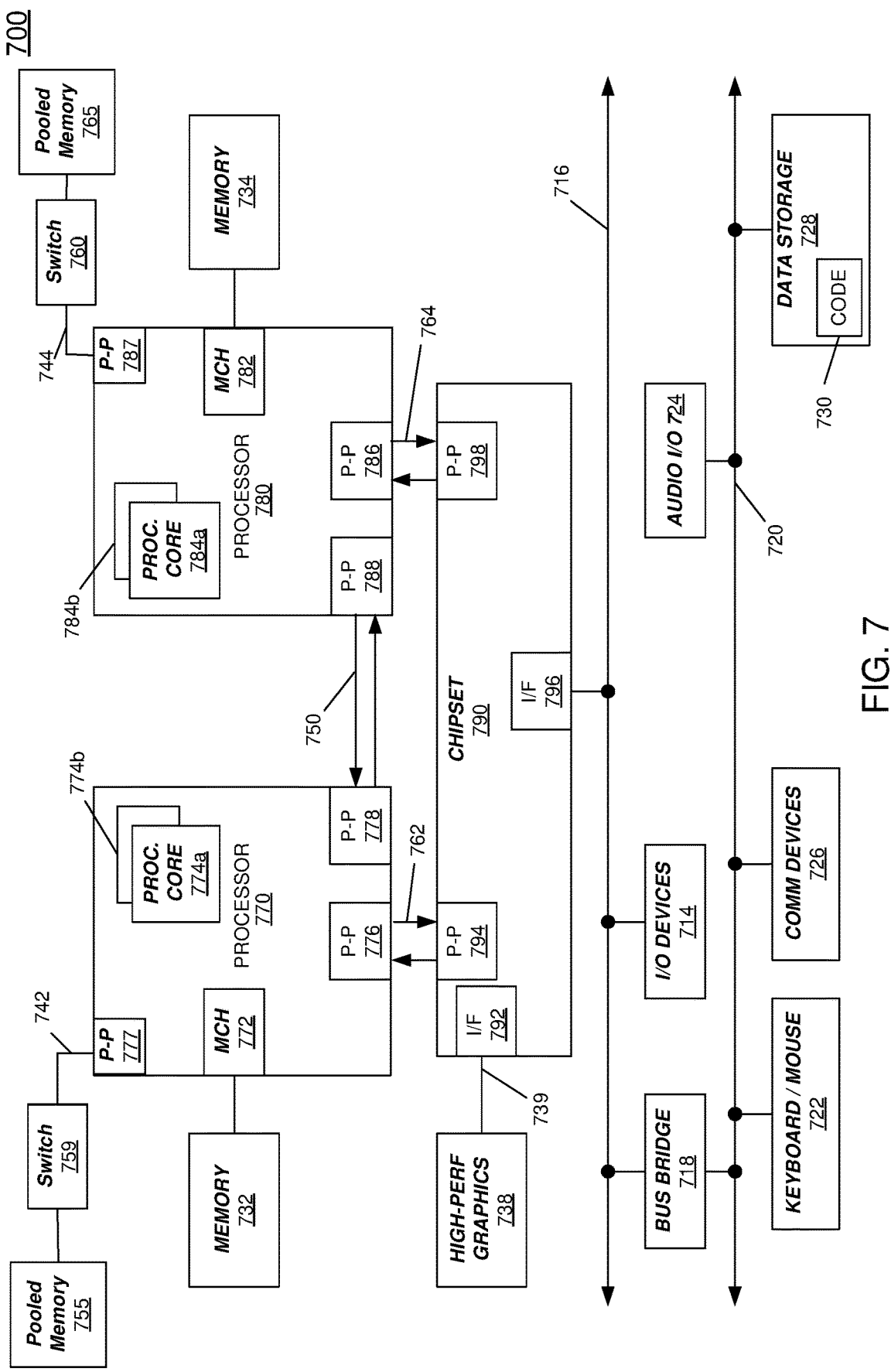
FIG. 7 is a block diagram of a system in accordance with another embodiment of the present invention.

Referring now to FIG. 7, shown is a block diagram of a system in accordance with another embodiment of the present invention such as an edge platform. As shown in FIG. 7, multiprocessor system 700 includes a first processor 770 and a second processor 780 coupled via a point-to-point interconnect 750. As shown in FIG. 7, each of processors 770 and 780 may be many core processors including representative first and second processor cores (i.e., processor cores 774a and 774b and processor cores 784a and 784b).

In the embodiment of FIG. 7, processors 770 and 780 further include point-to point interconnects 777 and 787, which couple via interconnects 742 and 744 (which may be CXL buses) to switches 759 and 760, which may perform CXL-based power sharing as described herein. In turn, switches 759, 760 couple to pooled memories 755 and 765.

Still referring to FIG. 7, first processor 770 further includes a memory controller hub (MCH) 772 and point-to-point (P-P) interfaces 776 and 778. Similarly, second processor 780 includes a MCH 782 and P-P interfaces 786 and 788. As shown in FIG. 7, MCH's 772 and 782 couple the processors to respective memories, namely a memory 732 and a memory 734, which may be portions of system memory (e.g., DRAM) locally attached to the respective processors. First processor 770 and second processor 780 may be coupled to a chipset 790 via P-P interconnects 776 and 786, respectively. As shown in FIG. 7, chipset 790 includes P-P interfaces 794 and 798.

Furthermore, chipset 790 includes an interface 792 to couple chipset 790 with a high performance graphics engine 738, by a P-P interconnect 739. As shown in FIG. 7, various input/output (I/O) devices 714 may be coupled to first bus 716, along with a bus bridge 718 which couples first bus 716 to a second bus 720. Various devices may be coupled to second bus 720 including, for example, a keyboard/mouse 722, communication devices 726 and a data storage unit 728 such as a disk drive or other mass storage device which may include code 730, in one embodiment. Further, an audio I/O 524 may be coupled to second bus 720.

Figure 8:
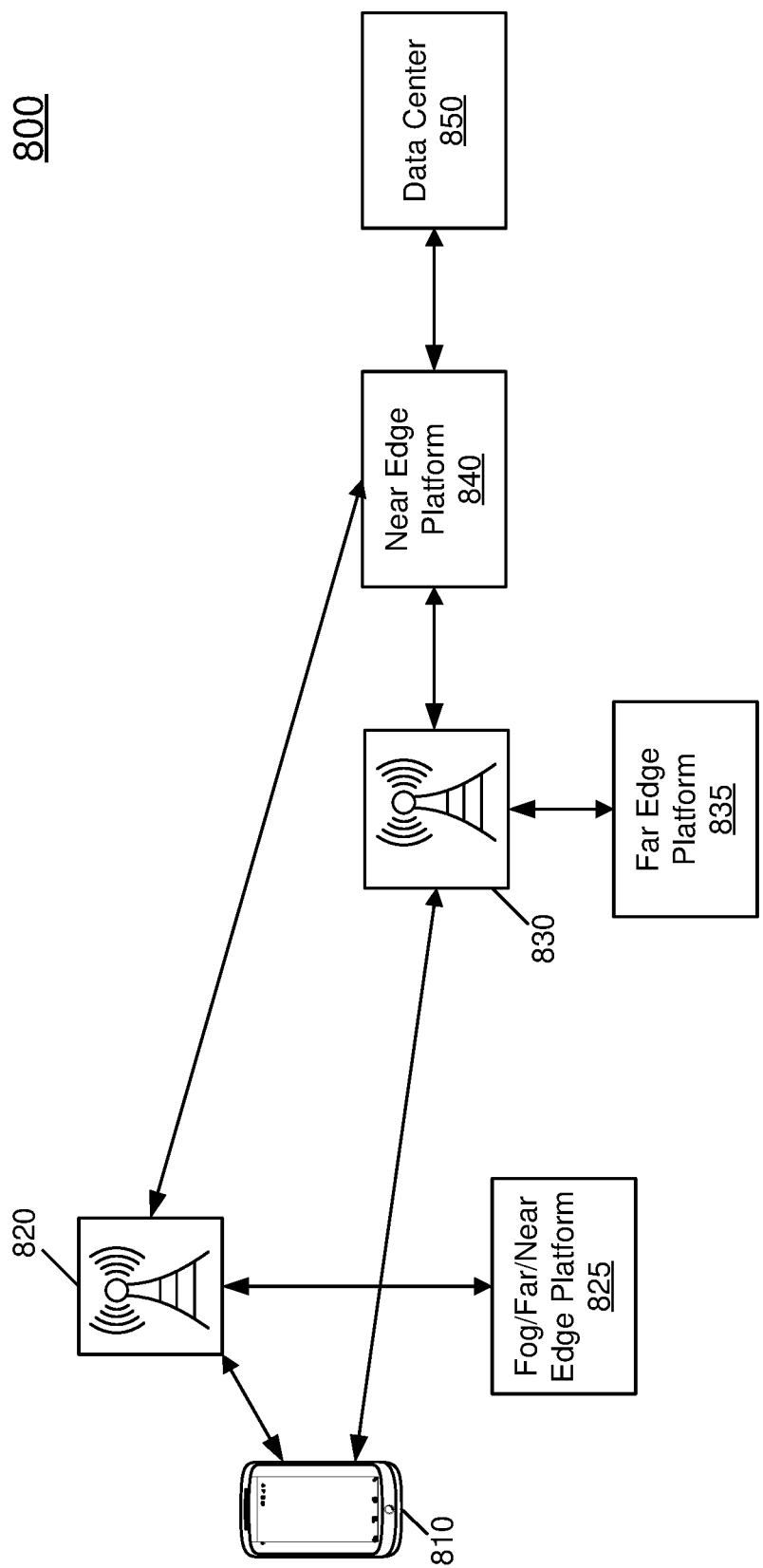
FIG. 8 is a block diagram of a network architecture in accordance with an embodiment.

Embodiments as described herein can be used in a wide variety of network architectures. To this end, many different types of computing platforms in a networked architecture that couples between a given edge device and a datacenter can perform dynamic power management using CXL communications according to a CXL.power protocol as described herein. Referring now to FIG. 8, shown is a block diagram of a network architecture in accordance with another embodiment of the present invention. As shown in FIG. 8, network architecture 800 includes various computing platforms that may be located in a very wide area.

In the high level view of FIG. 8, network architecture 800 includes a representative device 810, such as a smartphone. This device may communicate via different radio access networks (RANs), including a RAN 820 and a RAN 830. RAN 820 in turn may couple to a platform 825, which may be an edge platform such as a fog/far/near edge platform, and which may leverage embodiments herein. Other requests may be handled by a far edge platform 835 coupled to RAN 830, which also may leverage embodiments.

As further illustrated in FIG. 8, another near edge platform 840 may couple to RANs 820, 830. Note that this near edge platform may be located closer to a data center 850, which may have a large amount of computing resources. By pushing messages to these more remote platforms, greater latency is incurred in handling requests on behalf of edge device 810. Understand that one more of the platforms shown in FIG. 8 may incorporate embodiments to perform CXL-based power sharing as described herein.

The following examples pertain to further embodiments.

In one example, an apparatus includes: an interface to couple a plurality of devices of a system, the system including at least one CPU, at least one accelerator device, and at least one memory, the interface to enable communication according to a CXL protocol; and a power management circuit coupled to the interface, the power management circuit to: receive, from a first device of the plurality of devices, a request according to the CXL protocol for updated power credits; identify at least one other device of the plurality of devices to provide at least some of the updated power credits; and communicate with the first device and the at least one other device to enable the first device to increase power consumption according to the at least some of the updated power credits.

In an example, the apparatus comprises a storage having a plurality of entries, each of the plurality of entries to store power sharing information regarding a request for updated power credits.

In an example, the interface is to send a multicast request to at least some of the plurality of devices to request the updated power credits, in response to the request from the first device.

In an example, in response to the multicast request, the power management circuit is to receive a first offer from a second device of the plurality of devices, the first offer for a first plurality of power credits, and allocate at least some of the first plurality of power credits to the first device.

In an example, the interface is to: send a first unicast message to the second device to inform the second device regarding the allocation of the at least some of the first plurality of power credits to the first device, where the second device is to operate at a reduced power consumption level for a first duration; and send a second unicast message to the first device to inform the first device regarding the allocation of the at least some of the first plurality of power credits to the first device, where the first device is to operate at an increased power consumption level for the first duration.

In an example, the power management circuit is to: allocate less than the first plurality of power credits of the first offer to the first device; inform a third device that at least some power credits previously allocated to the third device have been withdrawn; and send a unicast message to the first device to inform the first device regarding the allocation of the first plurality of power credits and the at least some power credits to the first device for a first duration, where the first device is to operate at an increased power consumption level for the first duration.

In an example, the interface is to receive, via an out-of-band message, capability information from the plurality of devices, the capability information comprising, for each device, a minimum power credit level, an optimal power credit level, and a maximum power credit level.

In an example, the power management circuit is to identify the at least one other device based at least in part on the capability information for the at least one other device, where the at least one other device has an independent power source, the capability information of the at least one other device further comprising a sharing power credit level.

In an example, the power management circuit is to dynamically update the power credits for at least one of the plurality of devices in response to a dynamic insertion of an additional device into the system.

In an example, the apparatus comprises a first CPU, the first CPU to receive and send power management messages according to a CXL.power protocol.

In another example, a method includes: sending a CXL message from a first device of a system to at least a second device of the system to request to borrow power allocated to the at least second device; receiving a response from the at least second device, the response to indicate an amount of the power to be borrowed; and operating the first device at a higher power consumption level based at least in part on the amount of the power to be borrowed.

In an example, the method further comprises sending the CXL message as a unicast message from the first device to the second device, the first device and the second device comprising peer devices.

In an example, the method further comprises sending the CXL message comprising a duration of the borrow and a credit level to indicate a requested amount of the power to be borrowed.

In an example, the method further comprises, when the amount of power to be borrowed comprises a total power allocated to the second device, after the duration, causing the first device to provide at least some power allocated to the first device to the second device, for a second duration.

In an example, the method further comprises sending the CXL message from the first device to the second device according to a CXL.power protocol.

In an example, the method further comprises sending a second CXL message from the second device to a CXL hub to request to borrow additional power, where the CXL hub is, in response to the second CXL message, to send a multicast message to at least some of a plurality of devices of the system to request to borrow the additional power.

In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

In yet another example, a system comprises: a CPU having a plurality of cores and a first power management circuit; an accelerator coupled to the CPU via a CXL hub, the accelerator having a second power management circuit; and the CXL hub coupled to the CPU and the accelerator. The CXL hub comprises a third power management circuit to: receive, from the accelerator, a CXL request for increased power consumption for a first duration; identify at least one other device of the system from which to withdraw power sufficient to meet the increased power consumption for the first duration; and communicate with the accelerator and the at least one other device to enable the accelerator to increase power consumption for the first duration.

In an example, the accelerator is to: send the CXL request according to a CXL.power protocol; and send another CXL request to the CPU to request to borrow power for another time duration, the another CXL request comprising a unicast request.

In an example, the CXL hub is to identify a misbehavior of at least one device and prevent the at least one device from operation with increased power consumption.

In an example, the accelerator comprises a configuration storage to store power capability information, the accelerator to send the power capability information to the CXL hub, the power capability information comprising a minimum power credit level and a maximum power credit level.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. An apparatus comprising:
an interface to couple a plurality of devices of a system, the system including at least one central processing unit (CPU), at least one accelerator device, and at least one memory, the interface to enable communication according to a Compute Express Link (CXL) protocol; and
a power management circuit coupled to the interface, the power management circuit to:
receive, from a first device of the plurality of devices, a request according to the CXL protocol for updated power credits;
identify, based upon power redistribution negotiation, at least one other device of the plurality of devices to provide at least some of the updated power credits; and
communicate with the first device and the at least one other device to enable the first device to increase power consumption according to the at least some of the updated power credits.

2. The apparatus of claim 1, wherein the apparatus comprises a storage having a plurality of entries, each of the plurality of entries to store power sharing information regarding a request for updated power credits.

3. The apparatus of claim 1, wherein the interface is to send a multicast request to at least some of the plurality of devices to request the updated power credits, in response to the request from the first device.

4. The apparatus of claim 3, wherein in response to the multicast request, the power management circuit is to receive a first offer from a second device of the plurality of devices, the first offer for a first plurality of power credits, and allocate at least some of the first plurality of power credits to the first device.

5. The apparatus of claim 4, wherein the interface is to:
send a first unicast message to the second device to inform the second device regarding the allocation of the at least some of the first plurality of power credits to the first device, wherein the second device is to operate at a reduced power consumption level for a first duration; and
send a second unicast message to the first device to inform the first device regarding the allocation of the at least some of the first plurality of power credits to the first device, wherein the first device is to operate at an increased power consumption level for the first duration.

6. The apparatus of claim 4, wherein the power management circuit is to:
allocate less than the first plurality of power credits of the first offer to the first device;
inform a third device that at least some power credits previously allocated to the third device have been withdrawn; and
send a unicast message to the first device to inform the first device regarding the allocation of the first plurality of power credits and the at least some power credits to the first device for a first duration, wherein the first device is to operate at an increased power consumption level for the first duration.

7. The apparatus of claim 1, wherein the interface is to receive, via an out-of-band message, capability information from the plurality of devices, the capability information comprising, for each device, a minimum power credit level, an optimal power credit level, and a maximum power credit level.

8. The apparatus of claim 7, wherein the power management circuit is to identify the at least one other device based at least in part on the capability information for the at least one other device, wherein the at least one other device has an independent power source, the capability information of the at least one other device further comprising a sharing power credit level.

9. The apparatus of claim 1, wherein the power management circuit is to dynamically update the power credits for at least one of the plurality of devices in response to a dynamic insertion of an additional device into the system.

10. The apparatus of claim 1, wherein the apparatus comprises a first CPU, the first CPU to receive and send power management messages according to a CXL.power protocol.

11. At least one non-transitory machine-readable storage medium comprising instructions that when executed enable a system to perform operations comprising:
send a Compute Express Link (CXL) message from a first device of the system to at least a second device of the system to request to borrow power allocated to the at least second device;
receive a response from the at least second device, the response to indicate an amount of the power to be borrowed; and
operate, based upon power redistribution negotiation, the first device at a higher power consumption level based at least in part on the amount of the power to be borrowed.

12. The at least one non-transitory machine-readable storage medium of claim 11, further comprising instructions that when executed enable the system to send the CXL message as a unicast message from the first device to the second device, the first device and the second device comprising peer devices.

13. The at least one non-transitory machine-readable storage medium of claim 11, further comprising instructions that when executed enable the system to send the CXL message comprising a duration of the borrow and a credit level to indicate a requested amount of the power to be borrowed.

14. The at least one non-transitory machine-readable storage medium of claim 13, further comprising instructions that when executed enable the system, when the amount of power to be borrowed comprises a total power allocated to the second device, after the duration, to cause the first device to provide at least some power allocated to the first device to the second device, for a second duration.

15. The at least one non-transitory machine-readable storage medium of claim 11, further comprising instructions that when executed enable the system to send the CXL message from the first device to the second device according to a CXL.power protocol.

16. The at least one non-transitory machine-readable storage medium of claim 11, further comprising instructions that when executed enable the system to send a second CXL message from the second device to a CXL hub to request to borrow additional power, wherein the CXL hub is, in response to the second CXL message, to send a multicast message to at least some of a plurality of devices of the system to request to borrow the additional power.

17. A system comprising:
a central processing unit (CPU) having a plurality of cores and a first power management circuit;
an accelerator coupled to the CPU via a Compute Express Link (CXL) hub, the accelerator having a second power management circuit; and
the CXL hub coupled to the CPU and the accelerator, wherein the CXL hub comprises a third power management circuit to:
receive, from the accelerator, a CXL request for increased power consumption for a first duration;
identify, based upon power redistribution negotiation, at least one other device of the system from which to withdraw power sufficient to meet the increased power consumption for the first duration; and
communicate with the accelerator and the at least one other device to enable the accelerator to increase power consumption for the first duration.

18. The system of claim 17, wherein the accelerator is to:
send the CXL request according to a CXL.power protocol; and
send another CXL request to the CPU to request to borrow power for another time duration, the another CXL request comprising a unicast request.

19. The system of claim 17, wherein the CXL hub is to identify a misbehavior of at least one device and prevent the at least one device from operation with increased power consumption.

20. The system of claim 17, wherein the accelerator comprises a configuration storage to store power capability information, the accelerator to send the power capability information to the CXL hub, the power capability information comprising a minimum power credit level and a maximum power credit level.

* * * * *